(12) United States Patent
Tavakkol et al.

(10) Patent No.: US 9,760,831 B2
(45) Date of Patent: Sep. 12, 2017

(54) CONTENT PERSONALIZATION SYSTEM

(71) Applicant: LimeSpot Solutions Inc., Victoria (CA)

(72) Inventors: Aidin Tavakkol, Victoria (CA); Seyed Majid Ghaffari, Brooklyn, NY (US); Sanaz Tavakkol, Victoria (CA)

(*) Notice: Subject to any disclaimer, the term of this patent is extended or adjusted under 35 U.S.C. 154(b) by 319 days.

(21) Appl. No.: 14/475,204

(22) Filed: Sep. 2, 2014

(65) Prior Publication Data

US 2015/0066952 A1    Mar. 5, 2015

Related U.S. Application Data

(60) Provisional application No. 61/872,361, filed on Aug. 30, 2013.

(51) Int. Cl.
| | |
|---|---|
| *G06F 17/30* | (2006.01) |
| *G06N 5/04* | (2006.01) |
| *G06F 17/27* | (2006.01) |
| *G06Q 30/06* | (2012.01) |

(52) U.S. Cl.
CPC .......... *G06N 5/04* (2013.01); *G06F 17/2735* (2013.01); *G06F 17/2785* (2013.01); *G06F 17/30699* (2013.01); *G06Q 30/0631* (2013.01)

(58) Field of Classification Search
CPC .......... G06F 17/30699; G06F 17/2785; G06Q 30/0631
USPC ........................................ 707/748, 749, 752
See application file for complete search history.

(56) References Cited

U.S. PATENT DOCUMENTS

| | | | | |
|---|---|---|---|---|
| 6,266,649 | B1* | 7/2001 | Linden | G06Q 10/08345 |
| | | | | 705/14.51 |
| 6,826,574 | B1* | 11/2004 | Colbath | G06F 17/30067 |
| | | | | 707/733 |
| 2009/0089162 | A1* | 4/2009 | Davis | G06Q 30/00 |
| | | | | 705/14.73 |
| 2013/0013372 | A1* | 1/2013 | Gomez Uribe | G06Q 30/0201 |
| | | | | 705/7.29 |
| 2013/0218667 | A1* | 8/2013 | Mohamed | G06Q 30/02 |
| | | | | 705/14.45 |
| 2013/0218687 | A1 | 8/2013 | Sohanger et al. | |

* cited by examiner

*Primary Examiner* — Rehana Perveen
*Assistant Examiner* — Loc Tran (57) ABSTRACT

A system for personalizing content for presentation to a user. The system using: a keyword dictionary, being a database containing words and information on the relatedness of words, as a resource for identifying related words in words associated with each of the content and the user; a database containing inferred behavioral indices to predict user behavior; and a popularity index containing popularity indices for items within the content.

20 Claims, 11 Drawing Sheets

```
Copy Business Initial Content — 132
          ↓
Analyze and Tag — 112
          ↓
Condense — 113
          ↓
Search keyword dictionary for
item keywords — 133
          ↓
Assign Item Keywords — 134
          ↓
Assign Keyword-Associated
Demographic Rules — 135
          ↓
Business May Assign Rules — 136
          ↓
Business May Set Prevalence — 137
```

CONTENT PERSONALIZATION SYSTEM

CROSS REFERENCE TO RELATED APPLICATIONS

This application claims the benefit of U.S. Provisional Patent Application No. 61/872,361, filed 30 Aug. 2013, and incorporated by reference herein.

FIELD OF THE INVENTION

The present invention relates to the provision of information and the offering of products and services via the Internet, more specifically to the personalization of such content.

BACKGROUND OF THE INVENTION

Many different types of entities present information/content via the Internet, for example, online newspapers presenting articles, retailers offering products etc. To retain viewers/end users, such entities desire to present content that is likely to be of interest to viewers/end users. Thus, computer/Internet-implemented systems have been developed aimed at determining a user's interests. An example of such a system is disclosed in US 2013/0218687, application Ser. No. 13/556,058, filed 23 Jul. 2012, published 22 Aug. 2013, METHODS, SYSTEMS AND DEVICES FOR DETERMINING A USER INTEREST AND/OR CHARACTERISTIC BY EMPLOYING A PERSONALIZATION ENGINE.

SUMMARY OF THE INVENTION

The present invention is directed to a system for personalizing content (including, products, services, information (e.g., articles)) for presentation to an individual user.

In one aspect, the present invention provides a system for preparing a personalized ordered list of a plurality of items for online presentation to an individual user, the system including: a keyword targeting module, comprising: a keywords dictionary data set, comprising a plurality of dictionary words and relatedness indicators indicating whether any two of the dictionary words are related or unrelated; an items data set, comprising an item indicator for each item and for each item indicator, one or more item words, being words associated with the item and related words identified using the relatedness indicators; a user persona data set, comprising profile words, being words associated with the individual user and related words identified using the relatedness indicators; wherein, for each item, the keyword targeting module counts matches between item words and profile words, and returns a keyword targeting recommendation score for the item comprising the count result; a behavioural targeting module, that returns a behavioural targeting recommendation score for each item, from the individual user's online interactions with the items and values for the predictive relationship between items; a popularity targeting module that returns a popularity targeting recommendation score for each item, from a popularity index data set; and a merging and sorting module that: for each item, merges the keyword targeting recommendation score, behavioural targeting recommendation score and popularity targeting recommendation score, to produce a merged recommendation score; and based on the merged recommendation scores for the items, produces an ordered list of the items.

The keywords dictionary data set may be created by: copying a words source; condensing the words source copy by removing punctuation, prepositions, conjunctions, and determiners; producing relatedness quantifications for the relatedness between any two words in the condensed words source copy using latent semantic indexing; converting the relatedness quantifications to the relatedness indicators, based on a predetermined threshold wherein a relatedness quantification over the threshold is converted to a relatedness indicator of related, and a relatedness quantification at or below the threshold is converted to a relatedness indicator of unrelated; and normalizing the words in the condensed words source copy, being determining whether each word has a root and if so, replacing the word with its root.

The words source may be Wikipedia™.

Condensing the words source copy may be performed based on a linguistic analysis and tagging of the words source copy including using a linguistic analysis engine to examine each word in the words source copy and then tagging each word to indicate which part of speech it represents. The linguistic analysis engine may be Maxent™.

Determining whether each word has a root may be done utilizing WordNet™.

The predetermined threshold may be between about the 20th percentile and about the 40th percentile of the relatedness quantifications.

The items may be products offered by a business and the words associated with the items may include descriptive text, prices, brands, and trademarks associated with the items by the business.

The words associated with the individual user may be obtained from social media of the individual user.

Demographic rules may be associated with the items and the keyword targeting recommendation score for each item may include a determination of whether a demographic rule assigned to the item is satisfied based on demographic information obtained from the social media of the individual user. The demographic rule may be assigned to the item if a keyword assigned to the demographic rule matches an item word of the item. The demographic rule may be a filtered demographic rule wherein if the demographic rule is not satisfied the item to which the demographic rule is assigned is not present in the ordered list of the items.

The values for the predictive relationship between items may be calculated by applying a collaborative filtering process to a behaviour data set containing recorded and inferred user-item online interactions. The collaborative filtering process may be a matrix factorization model.

The behavioural targeting module may determine whether the individual user has a record of user-item online interactions and if not, the behavioural targeting module returns an initial neutral behavioural targeting recommendation score for each item and initiates real-time updating wherein the system records user-item interactions in real time, applies the collaborative filtering process to the real-time user-item interactions and updates the behavioural targeting recommendation score. The behavioural targeting module may also include determining whether a calculated behavioural targeting recommendation score is at or above a minimum score and if not, returning a neutral behavioural targeting recommendation score.

The popularity index data set may contain a popularity score for each item, based on an updated and normalized history of user-item interactions.

The merged recommendation score for each item may be produced by: multiplying the keyword targeting recommendation score by a keyword targeting coefficient to produce a keyword output; multiplying the behavioural targeting recommendation score by a behavioural targeting coefficient to produce a behavioural output; multiplying the popularity targeting recommendation score by a popularity targeting coefficient to produce a popularity output; and adding the keyword output, behavioural output and popularity output.

The system may also include a prevalence set for each item; and the merged recommendation score for each item may be produced by: multiplying the keyword targeting recommendation score by a keyword targeting coefficient to produce a keyword output; multiplying the behavioural targeting recommendation score by a behavioural targeting coefficient to produce a behavioural output; multiplying the popularity targeting recommendation score by a popularity targeting coefficient to produce a popularity output; multiplying the prevalence targeting recommendation score by a prevalence coefficient to produce a prevalence output; and adding the keyword output, behavioural output, popularity output and prevalence output.

The system may include: a user interface, for receiving information from and providing information to the individual user; one or more data storage devices and/or one or more computer memory components, and containing the keywords dictionary, the items data set, the user persona data set, the values for the predictive relationship between items, and the popularity index data set; one or more system computer processors, interconnected with or comprising the one or more data storage devices and/or one or more computer memory components, and having a two-way communication pathway to the user interface, and configured to implement the keyword targeting module, the behavioural targeting module, the popularity targeting module and the merging and sorting module.

DETAILED DESCRIPTION WITH REFERENCE TO THE DRAWINGS

Embodiments of the present invention include a personalized electronic commerce system 100, as shown in the drawings and explained in what follows.

Figure 1:
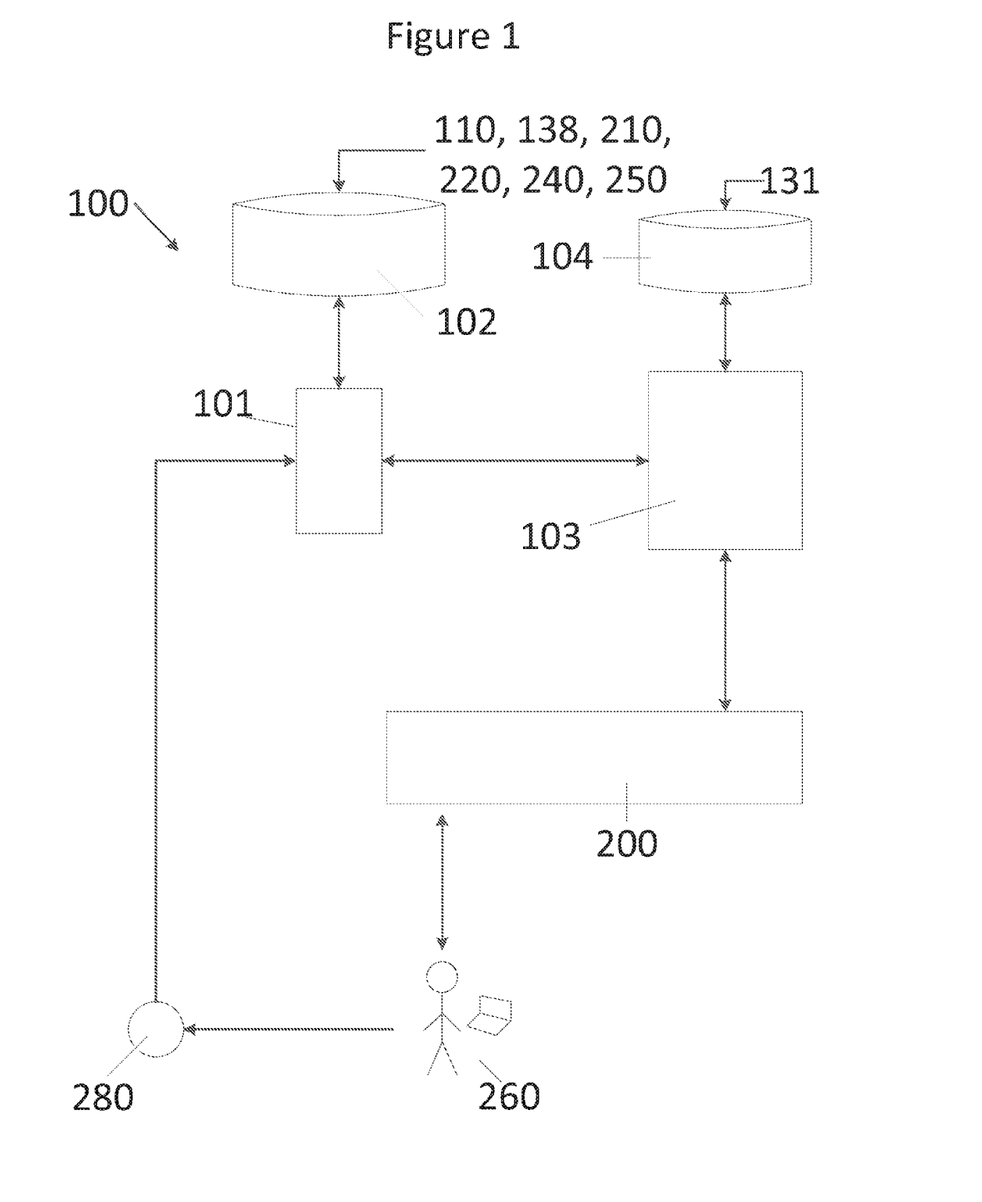
FIG. 1 is a simplified schematic representation of components of an embodiment of the present invention, and related actors and cooperating environment, showing a user interface hosted/supported by a business's server.
Figure 2:
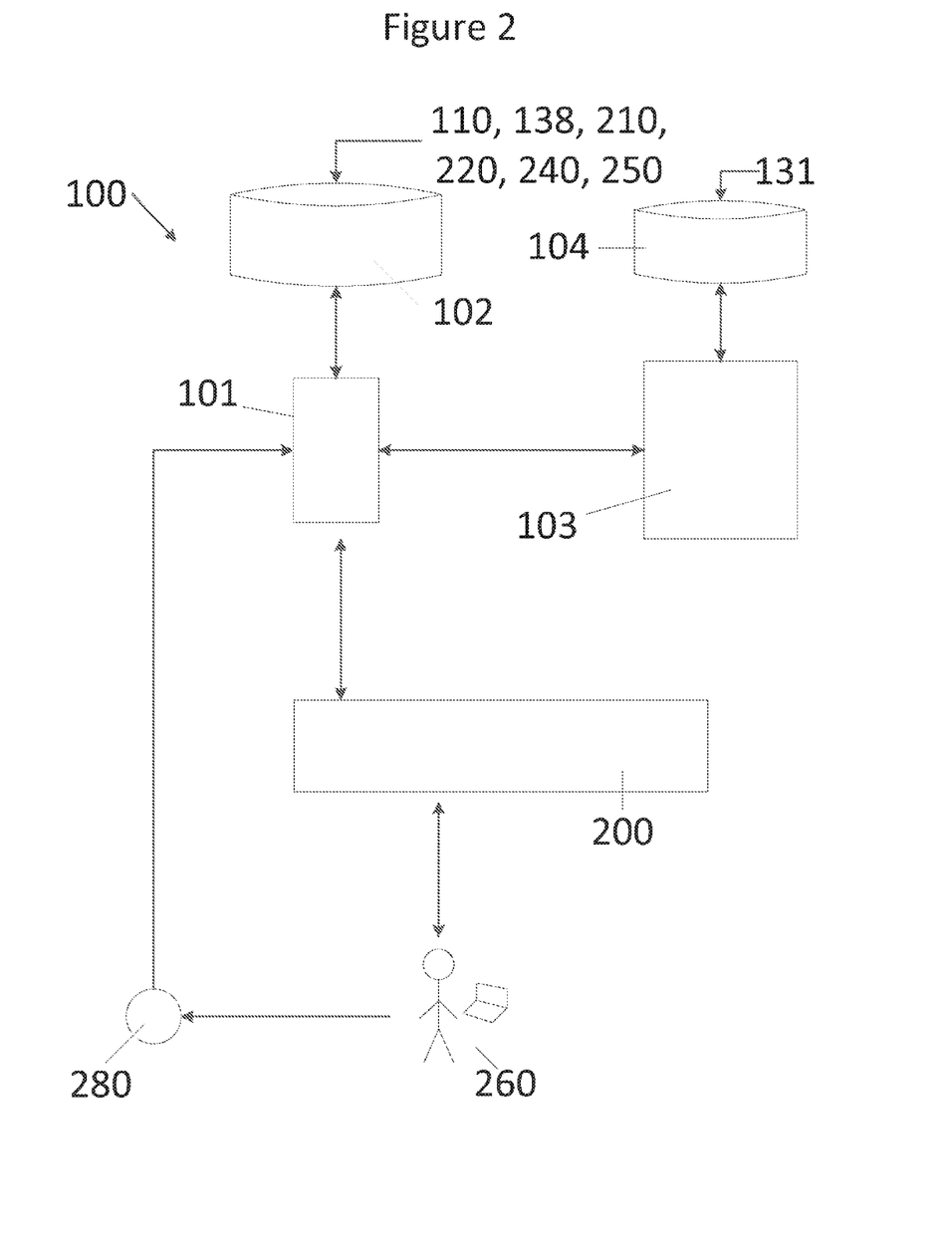
FIG. 2 is a simplified schematic representation of components of an embodiment of the present invention, and related actors and cooperating environment, showing a user interface hosted/supported by a system server.

Components of the personalized electronic commerce system 100 and the related actors and cooperating environment, include: a system server 101, being one or more computer processors providing the computing power to implement the personalized electronic commerce system 100; a system database 102, being one or more data storage devices and/or computer memory components accessible to the system server 110, and containing the keywords dictionary 110, processed business content 138, Activity Log Repository 210, Popularity Index 220, Behaviour Feedback Database 240 and Global CF Recommendation Agent 250; a business server 103, being one or more computer processors under the control of a business personalized electronic commerce system 100; a business database 104, being one or more data storage devices and/or computer memory components accessible to the business server 113, and containing the business's initial content 131; a user interface 200, being an Internet accessible web platform for presentation of items 140 as directed by the personalized electronic commerce system 100; end users 260, being persons using the Internet to investigate and purchase items; and user's social media 280, being Internet-based applications for the creation and exchange of user-generated content, including, but not limited to, Facebook™, Twitter™ and LinkedIn™.

As illustrated schematically in FIG. 1, the user interface 200 may be hosted/directly supported by the business server 103. Alternatively, as illustrated schematically in FIG. 2, the user interface 200 may be hosted/directly supported by the system server 101.

All or some of the communications between the components, actors and cooperating environment illustrated in FIGS. 1 and 2 will presumably be via the Internet, but for clarity, the communication path is not indicated in the drawings.

Figure 3:
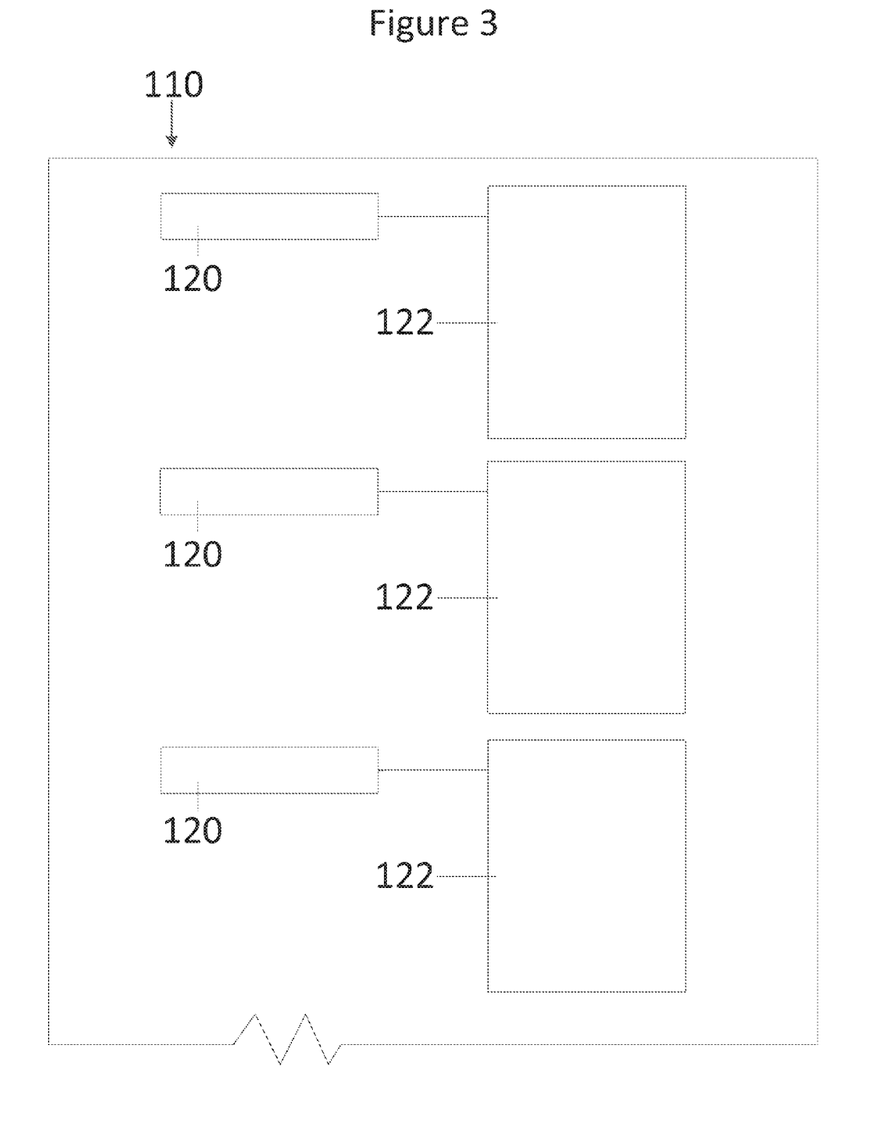
FIG. 3 is simplified schematic representation of a keywords dictionary of an embodiment of the present invention showing the conceptual association of keywords and related keywords.

As indicated in FIG. 3 (in which the conceptual association of keywords 120 and related keywords 122 is illustrated in a simplified schematic representation), the keywords dictionary 110 is a database containing keywords 120 and for each keyword 120, an indication whether another keyword is a related keyword 122, as explained in what follows.

Figure 4:
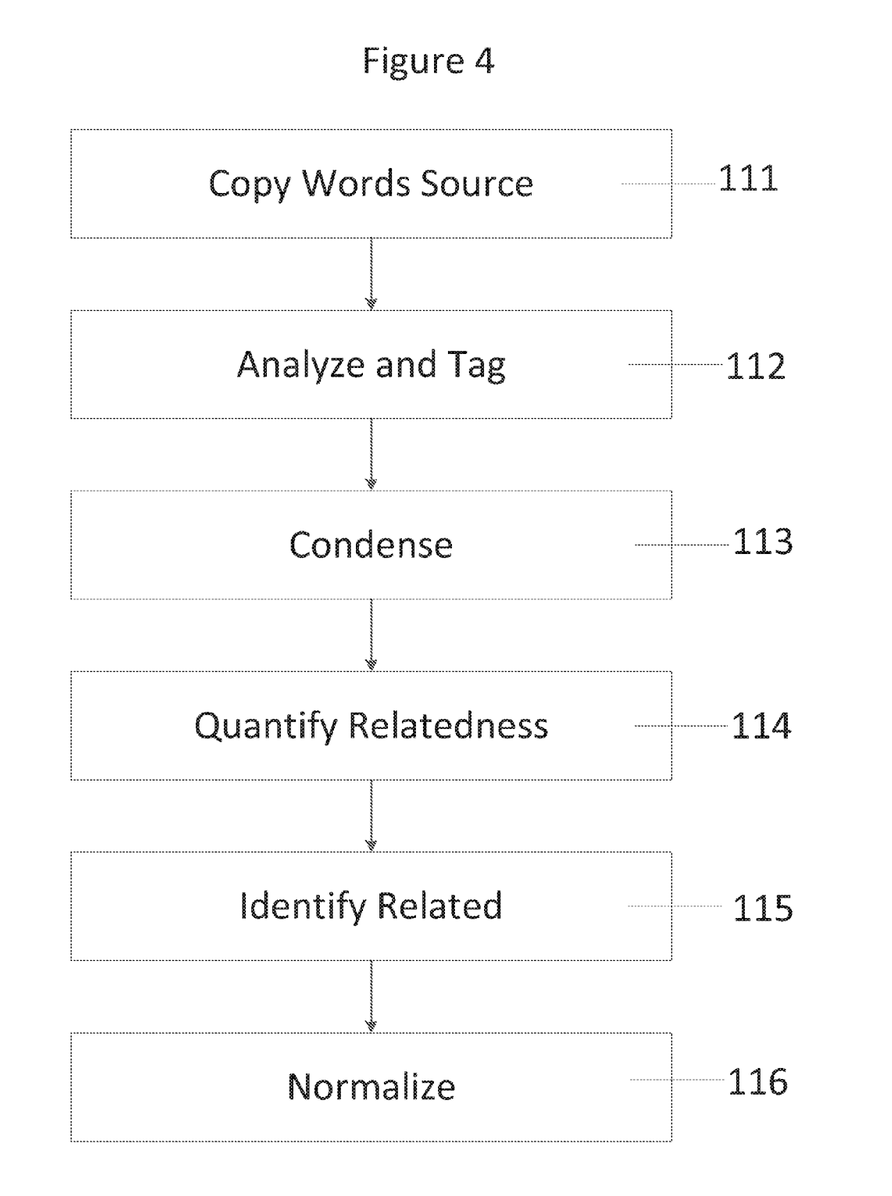
FIG. 4 is a schematic flow chart illustrating steps in the creation of a keywords dictionary of an embodiment of the present invention.

As indicated in FIG. 4, the keywords dictionary 110 is created from a copy of a suitable words source, preferably being multiple documents (e.g., articles) on a wide range of topics. The collaboratively edited, free-access, free content Internet encyclopedia, Wikipedia™, is an example of a suitable words source. Once a suitable words source is identified, the words source is copied 111.

The copy of the words source is analyzed and tagged 112, being that the copy of the words source is subjected to linguistic analysis and tagging, in which a linguistic analysis engine (e.g. Maxent™) is used to examine each word in the copy of the words source and then each word is tagged to indicate which part of speech it represents (e.g., noun, pronoun, adjective, verb, adverb). Based on this tagging, the copy of the words source is condensed 113, being that punctuation, prepositions, conjunctions, and determiners are removed from the copy of the words source, for the purpose of reducing the number of words that do not have relatively significant specific meanings.

Each of the remaining individual words, and expressions comprising multiple words, including proper nouns, is referred to as a "term" in what follows.

The next step is to quantify the relatedness between the terms 114. Latent Semantic Indexing (LSI), also known as Latent Semantic Analysis (LSA), is a computational method for discovering hidden meaningful concepts in document data. Each document and term is presented as a vector with elements corresponding to these concepts. Each element in a vector gives the degree of participation of the document or term in this concept.

To find these hidden semantic relationships and to expose document-document, document-term and term-term similarities, LSI uses Singular Value Decomposition (SVD) to construct an approximation to the term-document matrix. SVD considers the following relationships in a set of documents:
1. the number of times each term occurs in each document (using a term-document matrix);
2. the number of terms that any two documents have in common (using a document-document matrix); and
3. the number of documents in which any two terms occur together (using a term-term matrix).

Executing the SVD algorithm using these three matrices outputs a vector specific to each document and term. The cosine similarity of vectors is then calculated to rank documents in relation to a queried term. These similarity ranks are used to quantify the relatedness of terms.

An illustrative simplified example of an implementation of LSA is as follows:
If one were to have the following five sets of documents:
d1: Romeo and Juliet.
d2: Juliet: O happy dagger!
d3: Romeo died by dagger.
d4: "Live free or die", that's New-Hampshire's motto.
d5: Did you know, New-Hampshire is in New-England.
One could search them with the query "dies, dagger" using LSA to determine which documents are most related to the terms in the query and which terms within those documents are most related to the terms in the query. LSA would be capable of detecting implied relationships between words. For example, it would deduce that d1 is more closely related to the query than d5 (although neither document directly mentions "die" nor "dagger") because the term "Juliet" is mentioned together with the term "dagger" in d2 and the term "Romeo" is mentioned together with the terms "died" and "dagger" in d3; whereas d5 only contains one term indirectly related to the query, "New-Hampshire", which is mentioned in conjunction with "die" in d4.

In the creation of the keywords dictionary 110, the relatedness between any two terms is quantified as a numerical score outputted from Latent Semantic Analysis. The higher the outputted score, the greater the relatedness.

Once the relatedness score between every two terms has been determined, the relatedness scores are used to identify for each term (referred to in this paragraph as the first term), related terms. The related terms for the first term are the terms having relatedness scores that are both: within a defined number of the highest relatedness scores and above a minimum threshold. In the embodiment described herein, the defined number of the highest relatedness scores is 300 and the threshold is a relatedness score that is greater than the 30th percentile of all the relatedness scores for the first term (ignoring relatedness scores of 0). Thus, the maximum number of related terms is 300, but some first terms may not have 300 related terms. For example, a first term for which fewer than 300 terms have relatedness scores greater than 0, would not have 300 related terms. It is understood that usable results (in terms of a trade-off between processing time and comprehensiveness of the results) could be achieved with a different defined number of the highest relatedness scores and a different minimum threshold. For example, a defined number of the highest relatedness scores in the range of 100 to 500 and a threshold of a relatedness score that is greater than the 20th percentile of all the relatedness scores for the first term (again, ignoring relatedness scores of 0). To be clear, this identification of related terms is not symmetrical. For example, a first term being the name of a particular professional football player would presumably have "football" as a related term, but given the large number of terms that have non-0 relatedness scores for "football", the first term "football" would likely not have the name of the particular professional football player as a related term.

The next step is to normalize the terms and related terms, which involves determining whether each term or related term has an associated more-general root word and if so, replacing each such term with its root, which root is then the keyword 120 or the related keywords 122. Determining whether each term has an associated more-general root word may be done utilizing WordNet™, which is a lexical database for the English language that groups words into sets of synonyms called synsets, provides short, general definitions, and records the various semantic relations between these synonym sets.

As the thus produced keywords 120 include proper nouns (e.g., names of persons and things), a keywords dictionary 110 created as outlined above and using Wikipedia™ as a words source, indicates not just whether the keywords 120 and the related keywords 122 are or are not related in terms of their simple dictionary meanings, but also in terms of their use in the culture generally. For example, a sport would be related to particular teams, athletes, cities etc. A cause or ideology, for example conservatism or environmentalism, would be related to politicians, organizations, policies, publications etc.

Figure 5:
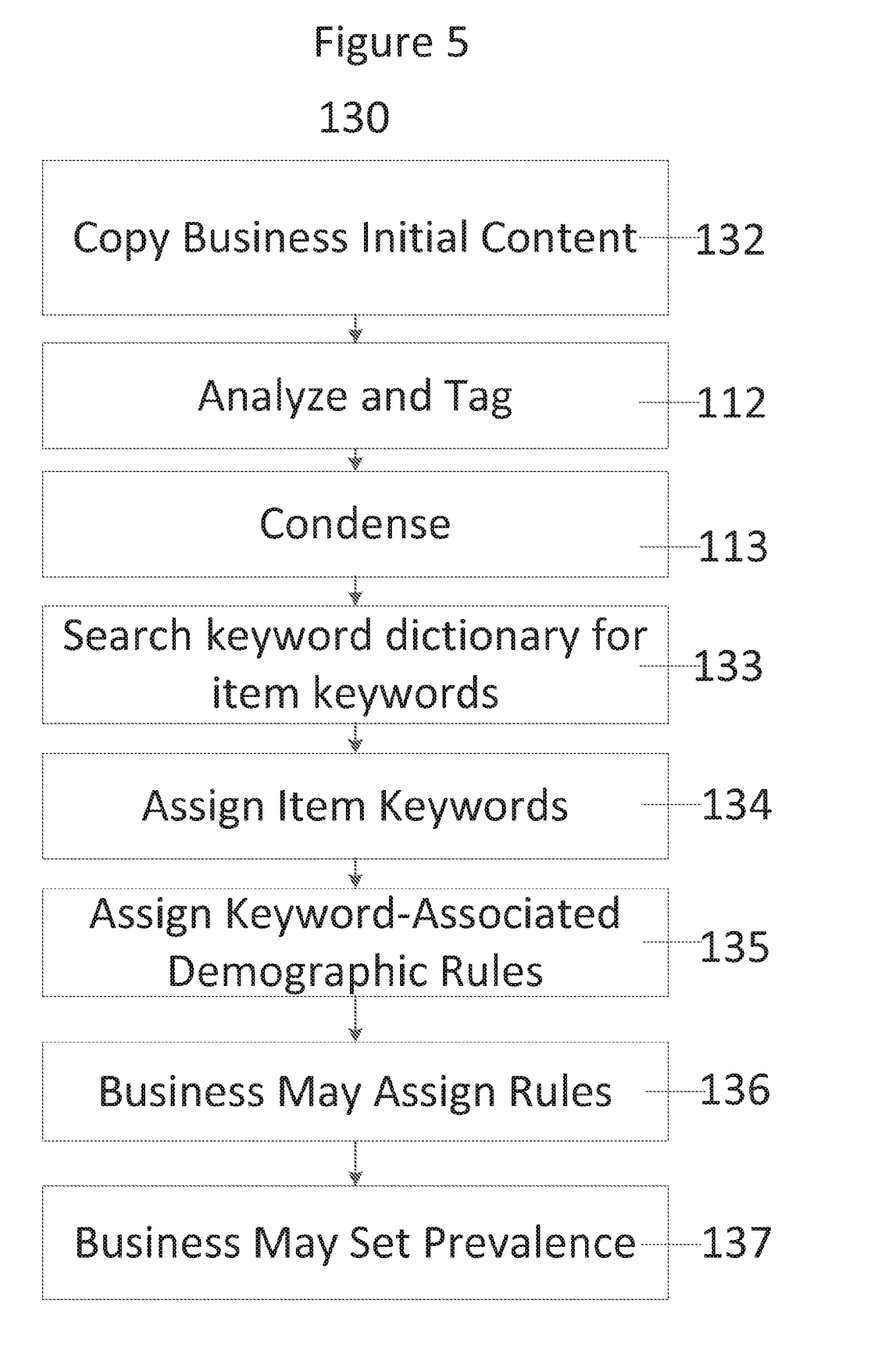
FIG. 5 is a schematic flow chart illustrating steps in business content processing in an embodiment of the present invention.

Enabling a business to utilize the personalized electronic commerce system 100, involves establishing a business account, business content processing 130 and creating a front end for the business.

Establishing a business account involves the creation of an identity and associated business data framework for the relevant business within the personalized electronic commerce system 100. Establishing a business account also enables the business server 103 and the personalized electronic commerce system 100 to interact directly, typically via the Internet.

Once a business account has been established, business content processing 130 may begin. The business's initial content 131 is the descriptive text and other text (e.g., prices, brands, trademarks etc.) associated with each item 140 that the business wishes to present to end users via the personalized electronic commerce system 100. Business content processing 130 results in the identification and assigning of prioritized keywords 150 to each item 140, and optionally assigning one or more filtered keyword rules 160, prioritized demographic rules 180 and/or filtered demographic rules 170 to each item 140, and/or setting a prevalence 190 for each item 140.

The business's initial content 131 is typically in an existing business database 104 accessible via a business server 103 and is typically configured for use with one of the publicly-available e-commerce platform (e.g. Shopify™, Magento™, BigCommerce™, WooCommerce™, Drupal™ etc.). Preferably, ongoing access to the business's content database 131 is established so as to enable automatic synchronization and updating. Alternatively, if the business's initial content is in an unconventional or unsupported format, it may be necessary to convert it to a usable format, for example, in a spreadsheet (e.g., Excel in a standardized format).

As indicated in FIG. 5, business content processing 130 includes copying the business's initial content 132 to a suitable business data framework. The copy of the business's initial content is analyzed and tagged 112 and condensed 113.

Then, the keywords dictionary 110 is searched 133 for each of the remaining words. For each of the remaining words for which there is a corresponding keyword 120 in the keywords dictionary 110, that corresponding keyword 120 and all related keywords 122 are assigned 134 to each item 140 with which the relevant word is associated. Each such corresponding keyword 120 and related keyword 122 assigned to an item, is referred to herein as an prioritized keyword 150.

A filtered keyword rule 160 is a rule that a business can apply to an item 140 to determine whether the item 140 will be presented. If a filtered keyword rule 160 is not satisfied, being, as set out in what follows, the profile keywords 320 of an end user 260 do not include the filtered keyword, then the item 140 or items 140 to which the filtered keyword rule 160 applies will not be presented to the end user 260.

Demographic rules are rules that the business can apply to an item 140 to determine whether the item 140 will be presented and/or to affect the ranking of the item 140. Criteria for demographic rules include the user's age, gender, location, hometown, relationship status, and interest categories.

A filtered demographic rule 170 is a demographic rule that must be satisfied for an item 140 to be presented to the end user 260. A prioritized demographic rule 180 is a demographic rule that affects the ranking of an item 140. Failing to satisfy a prioritized demographic rule 180 will not prevent an item 140 from being presented to an end user 260, but the satisfaction of a prioritized demographic rule 180 will tend to increase the final merged recommendation score 390 for the item 140.

Keywords 120 may be associated with demographic rules 170, 180 to enable the assignment 135 of such keyword-associated demographic rules 170, 180 to items 140. If, an item 140 is found to have an prioritized keyword 150 that matches a keyword 120 associated to a demographic rule 170, 180, that keyword-associated demographic rule 170, 180 is then assigned to that item 140. For example, a demographic rule 170, 180 intended to determine whether an end user is located in the USA, could be associated with "USA", "US" and "America" thus enabling the assignment of the demographic rule 170, 180 to items 140 for which "USA", "US" or "America" is an prioritized keyword 150.

Optionally, the business may assign rules 136. Preferably, the personalized electronic commerce system 100 is configured to present a selection of standard demographic rules 170, 180 to the business, tailored to the type or types of items the business is offering. For example, demographic rules that are satisfied if a user is male, if a user is female, if a user is between the ages of 18 to 25, if a user is between the ages of 25 and 40, or if a user is above the age of 40, may be made automatically available to all businesses. More specific demographic rules may be automatically available to different business types. For example, demographic rules related to location, may be presented to a business offering sports-related items (i.e. as an indication that a user may be a fan of a particular sports team). Optionally, the business may construct and assign custom demographic rules 170, 180. For instance, a business could construct and assign a demographic rule 170, 180 to one or more items, that would be satisfied by a user who is female and below the age of forty but not from the United Kingdom.

The business may examine, and optionally edit and add to, the assigned prioritized keywords 150, filtered keyword rules 160, and filtered demographic rules 170 and prioritized demographic rules 180.

The business may also set 137 the prevalence 190 for each item 140. The default prevalence 190 for each item is 0. In the exemplary personalized electronic commerce system 100 described herein, the business may alter this prevalence 190 within a numerical scale from −5 to 5. A 0 prevalence does not affect the final merged recommendation score 390 for an item 140, whereas a negative prevalence reduces the final merged recommendation score 390 and a positive prevalence increases the final merged recommendation score 390.

Figure 6:
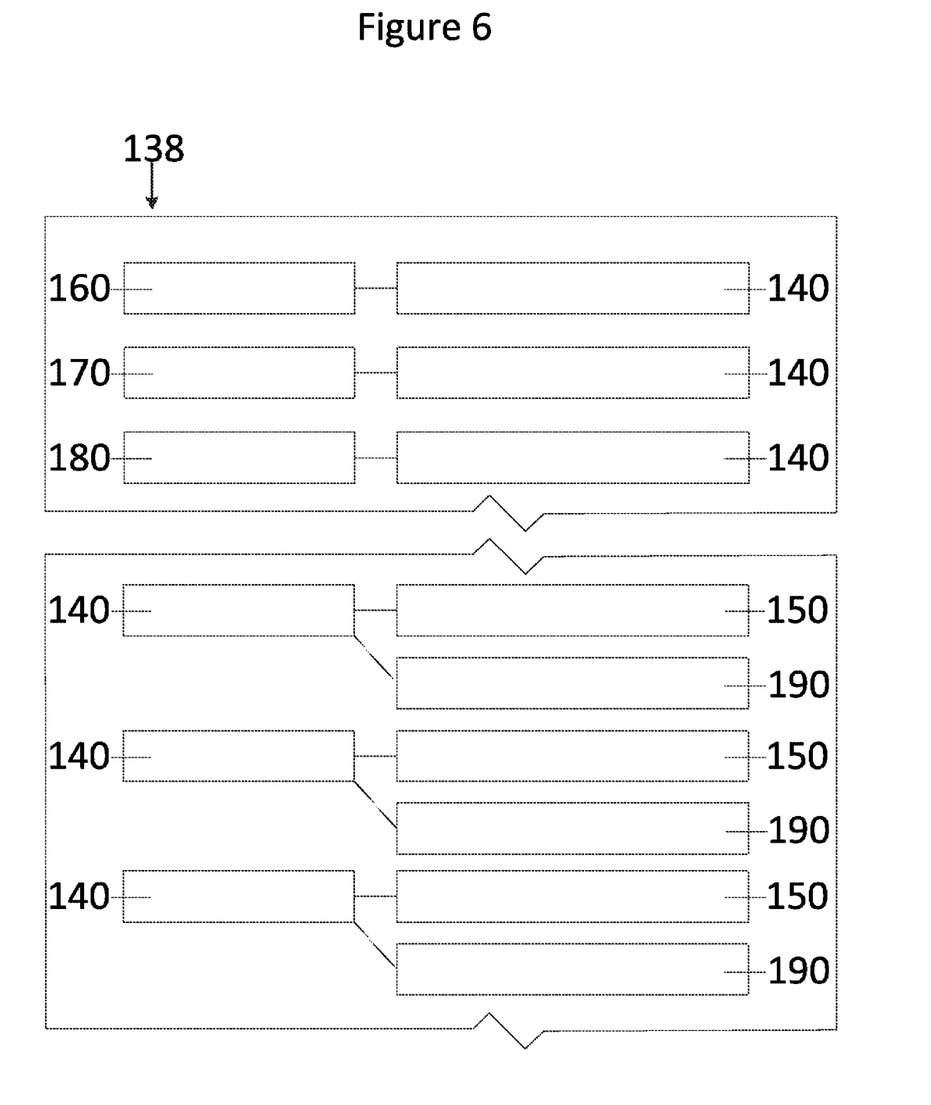
FIG. 6 is simplified schematic representation of information/date in a processed business content of an embodiment of the present invention.

The conceptual association of data/information in the processed business content 138 is illustrated in a simplified schematic representation in FIG. 6. As indicated, the processed business content 138 provides a list of the items 140 with which each filtered keyword rule 160, filtered demographic rule 170 and prioritized demographic rule 180 is associated. As well, the processed business content 138 provides the prioritized keywords 150 and prevalence 190 for each item 140.

Creating a front end involves creating an Internet accessible user interface 200 for presentation of the items 140 to end users 260. The user interface 200 may be implemented by modifying the business's content management system such that items 140 are displayed on the business's existing web platform (with the business's predefined, and presumably preferred, display configuration and appearance), with the ordering of the items determined by information provided to the business's content management system by the personalized electronic commerce system 100.

Alternatively, the business may create a user interface 200 within the personalized electronic commerce system 100, using a webpage editor that may be provided via the personalized electronic commerce system 100. Preferably, the webpage editor is a WYSIWYG (What You See Is What You Get) User Interface builder, being a system in which content (text and graphics) onscreen during editing appears in a form closely corresponding to its appearance when printed or displayed as a finished product.

The user interface 200 is configured to present item indicators for a plurality of items 140, and to provide additional information and a purchasing option for an item 140 (i.e., by opening a new window) when a user 260 clicks on the item indicator for that item 140.

Once a user interface 200 has been created and made publicly accessible, each user action on the user interface 200 is recorded and indexed as an entry in the Activity Log Repository 210, with relevant data such as the type of event (e.g., clicking on an item indicator, spending time viewing an item, purchasing an item, liking an item, sharing an item, and viewing alternate images of an item), the user responsible for the event, the time of the event, and the item 140.

A Popularity Index 220, comprising a popularity score 230 for each item 140, is created by fetching and processing entries from the Activity Log Repository 210. The Popularity Index 220 is updated by periodically fetching and processing entries from the Activity Log Repository 210 which have occurred since the previous fetching of entries from the Activity Log Repository 210.

The popularity score 230 for each item 140 is determined and updated as follows:

a) Scores for Each User's New Interactions Normalized. The number of times each user has interacted with each item 140 in each particular manner within the last time interval is compared to a set maximum for the particular manner of interaction. If the number of times a user has interacted with the item 140 in the particular manner within the last time interval exceeds the set maximum, that number is reduced to the set maximum. After the record for the number of each such manner of interactions has been reduced, each record is divided by its set maximum. Then, each record is multiplied by a weighting coefficient and the records are summed to produce a popularity score 230 for each item 140 for each user within the most recent time interval. See the below pseudocode and formulae.

let $n_k$ be the number of times a particular user has interacted with a particular item in a particular way in the last time interval;

let $c_k$ be the weighting coefficient for the particular type of interaction $n_k$;

let p be the raw popularity score for a particular item in the last time interval;

for each $n_k$, if $n_k > n_{k_{limit}}$ then $n_k = n_{k_{limit}}$;

for each $n_k$, $n_k = n_k \div n_{k_{limit}}$;

$p = \Sigma_{k=2}^{k_{max}} c_k \times n_k$;

b) Popularity Score Updated and Normalized. The popularity score 230 for each item 140 is updated according to the following formula:

$$\text{Popularity Score} = \frac{\frac{1}{\Delta T} \times \text{Old Score} + \frac{\text{New Score}}{\text{New Score}_{max}}}{\frac{1}{\Delta T} + 1} \times 1000$$

The Behaviour Feedback Database 240 is created and updated as follows:
1. Fetching entries from the Activity Log Repository 210.
2. Calculating and Normalizing User Scores for Items Based on Interactions. A formula is used to calculate a normalized score for each item 140 for each user 260, indicating the interest of the user 260 in that particular item 140, as indicated in the following pseudocode and formulae.

let $n_k$ be the number of times a particular user has interacted with a particular item in a particular way;

let $c_k$ be the weighting coefficient for the particular type of interaction $n_k$;

let b be the score indicating the interest of the user in that particular item;

for each $n_k$, in $n_k > n_{k_{limit}}$ then $n_k = n_{k_{limit}}$;

for each $n_k$, $n_k = n_k \div n_{k_{limit}}$;

$b = (\Sigma_{k=0}^{k_{max}} c_k \times n_k) \div (\Sigma_{k=0}^{k_{max}} c_k)$;

3. Tabulating Normalized Scores in a Matrix of All Users and Items. The normalized scores are recorded in a matrix in a manner indicating the interaction scores for each user and each item, the matrix having, for example, three columns for each row, one column for a user ID, a second column for an item ID and a third column for the interaction score for that user with that item.

4. Updating Behaviour Feedback Database 240. The Behaviour Feedback Database 240 is periodically updated (preferably, each time the Activity Log Repository 210 is updated). When the Behavioural Feedback Database 240 is updated, only the entries that need to be updated to reflect changes in the Activity Log Repository are updated.

The Global CF Recommendation Agent 250 contains the information in the Behavioural Feedback Database 240, plus inferred data, being that, as compared to the Behavioural Feedback Database 240, in the Global CF Recommendation Agent 250, the blank spaces contain data.

The Global CF Recommendation Agent 250 is created, and updated, by applying a collaborative filtering process to a copy of the Behavioural Feedback Database 240. The collaborative filtering process uses a version of the latent factor approach, called the matrix factorization model (also known the Single Value Decomposition model or SVD model) to discover latent features associated with observed ratings. The SVD-based matrix factorization model transforms both items 140 and users 260 to a joint latent factor space, and with the goal of explaining user-item interaction ratings by characterizing both items 140 and users 260 in terms of factors that are inferred from both explicit user feedback, such as rating an item, and implicit user feedback, such as clicking on an item.

The application of the collaborative filtering process to the populated matrix of user-item scores (i.e., the copy of the Behavioural Feedback Database 240), includes:

a. Vacant Item Scores Inferred from Trends in Matrix. Trends in the matrix are analyzed to determine likely scores for vacant entries. For instance, if several users have similar scores with similar items, their scores will be used to fill in the blank fields for each of those users.

b. Coefficients Indicating Item Predictive Relationships Determined. Trends in the matrix are analyzed to produce values, referred to herein at times as recorded coefficients, related to the strength of the predictive relationship between items.

To minimize delays due to processing, the Global CF Recommendation Agent 250 is preferably not updated in real time, but rather is updated periodically, albeit preferably relatively frequently, as a background task, with the updating frequency depending on server availability and any backlog of unprocessed entries in the Activity Log Repository 210.

Figure 7:
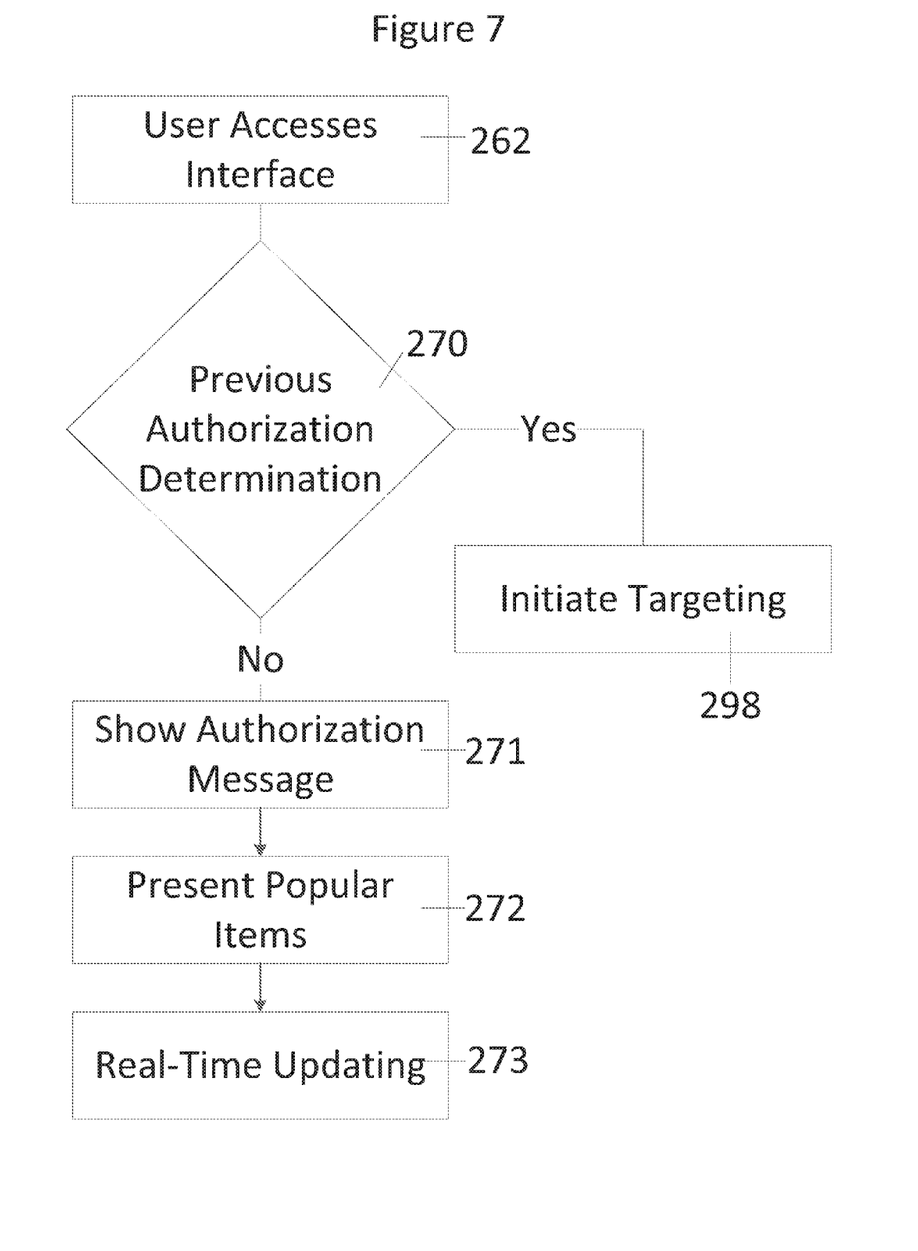
FIG. 7 is a schematic flow chart illustrating steps when a user accesses a user interface embodiment of the present invention.

As indicated in FIG. 7, when an end user 260, being a person using the Internet to investigate and purchase items, accesses 262 a user interface 200, the personalized electronic commerce system 100 make a previous authorization determination 270, meaning the personalized electronic commerce system 100 determines whether the end user 260 has previously authorized the personalized electronic commerce system 100, which includes authorizing access to the social media 280 of the end user 260.

If the end user 260 has not previously authorized access, the user interface 200 shows an authorization message 271, being that the personalized electronic commerce system 100 invites the end user 260 to authorize access; and presents popular items 272, being that the items 140 initially presented on the user interface 200 are ordered based on popularity scores 230 for the business's items 140 fetched from the popularity index 220. If two or more items 140 have identical popularity scores 230, their relative ordering is randomized.

If an anonymous user, being a person who has not authorized access, begins interacting with the initial presentation of ordered items 140 (for example, the anonymous user clicks on an item indicator so as to open a window with information on the item), the personalized electronic commerce system 100 performs real-time updating 273, being that the personalized electronic commerce system 100 monitors the interactions in real time and updates the item ordering based on the monitored interactions and the recorded coefficients (i.e., related to the strength of the predictive relationship between items), in the Global CF Recommendation Agent 250.

Figure 8:
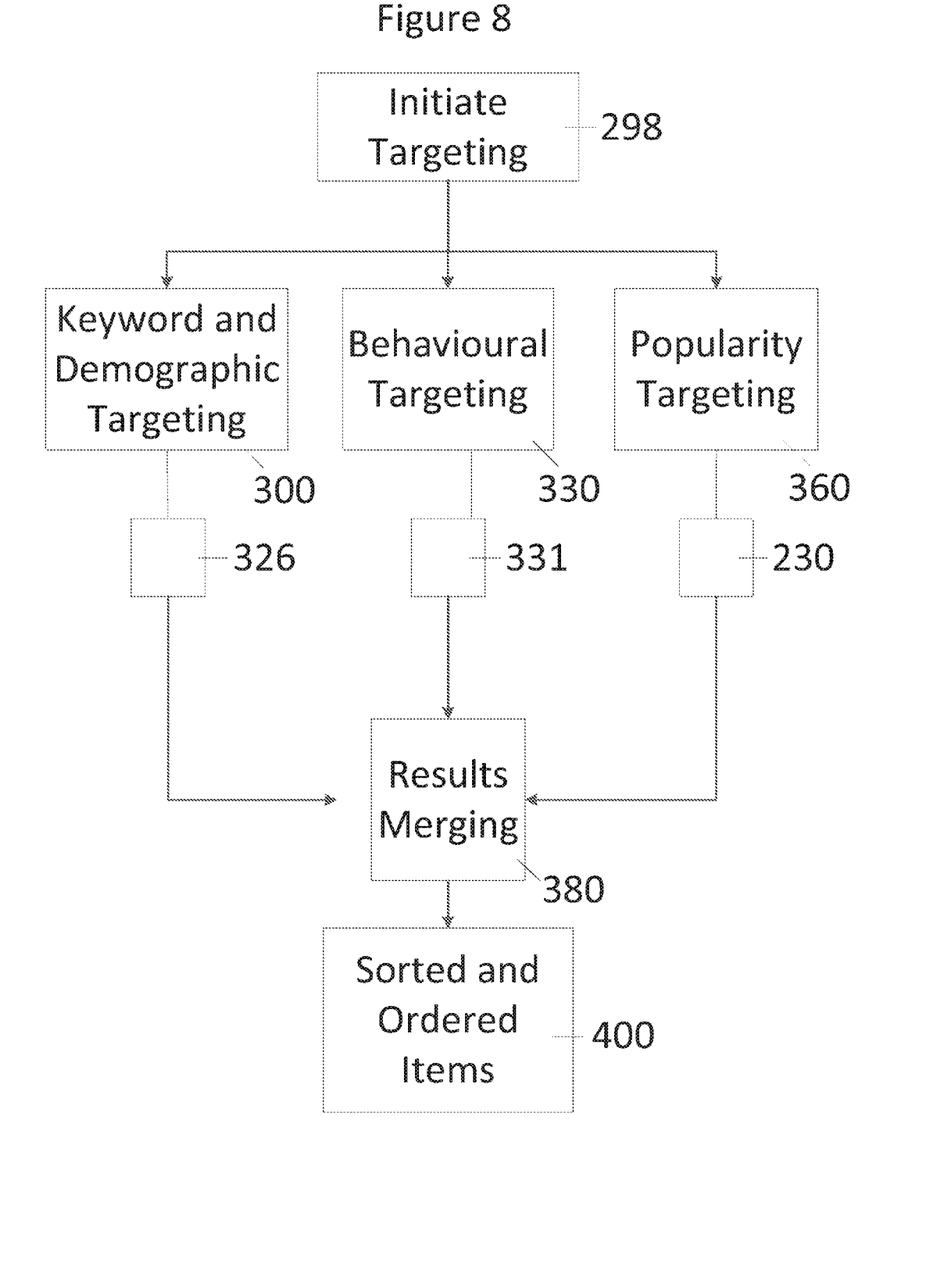
FIG. 8 is a schematic flow chart illustrating steps and outputs in targeting in an embodiment of the present invention.

When an end user 260 who has authorized access, accesses a user interface 200, the personalized electronic commerce system 100 initiates targeting 298, being that the personalized electronic commerce system 100 performs keyword and demographic targeting 300 (at times referred to herein as K and D targeting), behavioural targeting 330, popularity targeting 360 and results merging 380, as indicated in FIG. 8.

Figure 9:
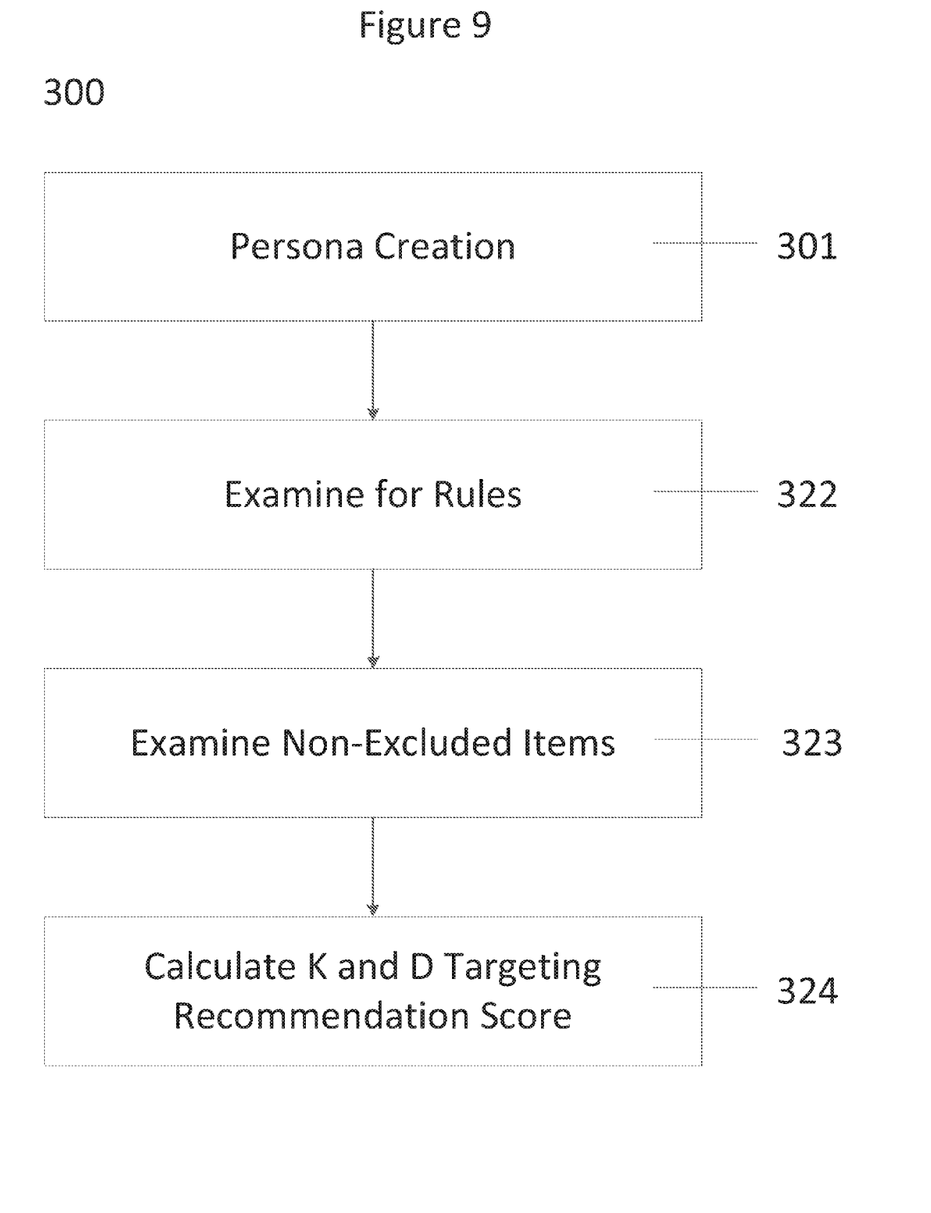
FIG. 9 is a schematic flow chart illustrating steps in keyword and demographic targeting in an embodiment of the present invention.
Figure 10:
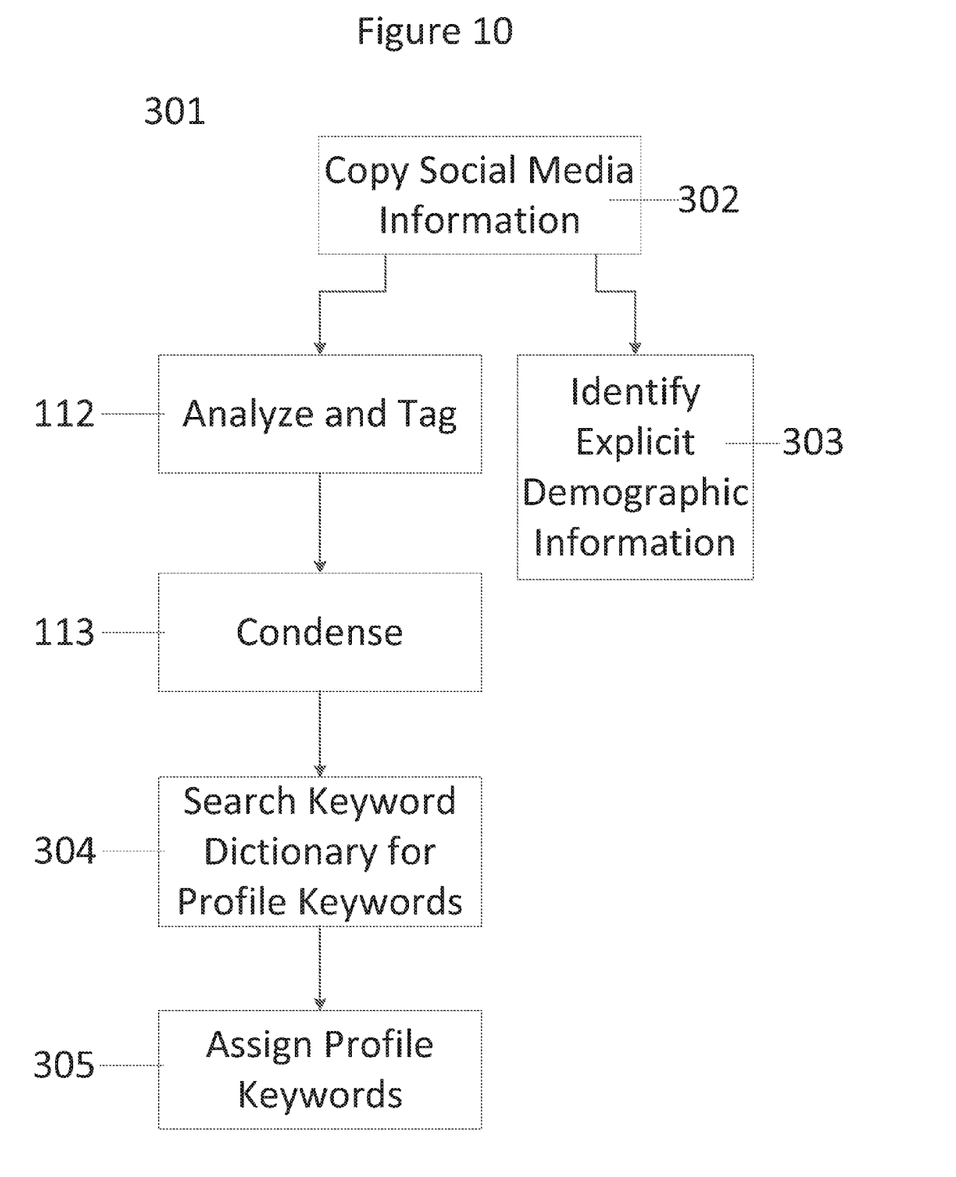
FIG. 10 is a schematic flow chart illustrating steps in persona creation in an embodiment of the present invention.

As indicated in FIGS. 9 and 10, keyword and demographic targeting 300 involves persona creation 301, which occurs each time an end user 260 who has authorized access 610, accesses 262 a user interface 200. The social media 280 of an end user 260 typically includes explicit demographic information, e.g., the age, gender and general location of residence of the end user 260; and indications of interests, for example their "likes" on Facebook and the content of their "tweets" on Twitter. Persona creation 301 involves copying social media information 302, being the text, and demographic and interests information from the social media 280 of the end user 260, so as to identify explicit demographic information 303, and assign profile keywords 304.

Assigning profile keywords 304 involves processing the text copied from the social media 280. The copy of the text from the social media 280 is analyzed and tagged 112 and condensed 113. Then, each of the remaining words is searched 304 for in the keywords dictionary 110. For each of the remaining words for which there is a corresponding keyword 120 in the keywords dictionary 110, the corresponding keyword 120 and all related keywords 122 are assigned 305 to the persona 310. Each such corresponding keyword 120 and related keyword 122 assigned to the persona 310 is referred to herein as a profile keyword 320.

The profile keywords 320 and the demographic information of the end user 260 are examined for rules 322, being the profile keywords 320 and the demographic information of the end user 260 are examined against all filtered keyword rules 160, filtered demographic rules 170 and prioritized demographic rules 180 to identify:
a) excluded items, being items having either a filtered keyword rule 160 that is not satisfied by the profile keywords or a filtered demographic rule 170 that is not satisfied by the demographic information of the end user 260;
b) true filtered demographic rules, being filtered demographic rules 170 that are satisfied by the demographic information 622 of the end user 260;
c) true prioritized demographic rules, being prioritized demographic rules 180 that are satisfied by the demographic information 622 of the end user 260; and
d) true filtered keyword rules, being filtered keyword rules 160 that are satisfied by the profile keywords.

The items 140 that are not excluded items are examined 323, wherein for each such item 140, the number of each of, true filtered demographic rules, true prioritized demographic rules, true filtered keyword rules, and profile keywords 320 matching prioritized keywords 150, is counted and then a K and D targeting recommendation score 326 is calculated 324 by summing the counts as indicated in the following pseudocode and formulae.

let $n_1$ number of matching prioritized keywords;
let $n_2$ number of matching filtered keywords;
let $n_3$ number of matching prioritized demographic rules;
let $n_4$ number of matching filtered demographic rules;
let $c_k$ be the weighting coefficient for each $n_k$, where $1<k\leq4$;
let b be the score indicating the interest of the user in that particular item;
for each $n_k$, if $n_k > n_{k_{limit}}$ then $n_k = n_{k_{limit}}$;
for each $n_k$, $n_k = n_k \div n_{k_{limit}}$;

$$b = (\Sigma_{k=1}^{4} c_k \times n_k) \div (\Sigma_{k=0}^{k_{max}} c_k);$$

Different weighting coefficients may be used for keywords or demographic rules depending on the type of items offered by the business. For example, a business offering sports-related items may wish to give higher weightings to rules related to location in association with items for fans of sports teams at or near the location. Alternatively, a business offering fashion items may wish to give higher weightings to keywords indicating fashion tastes.

Figure 11:
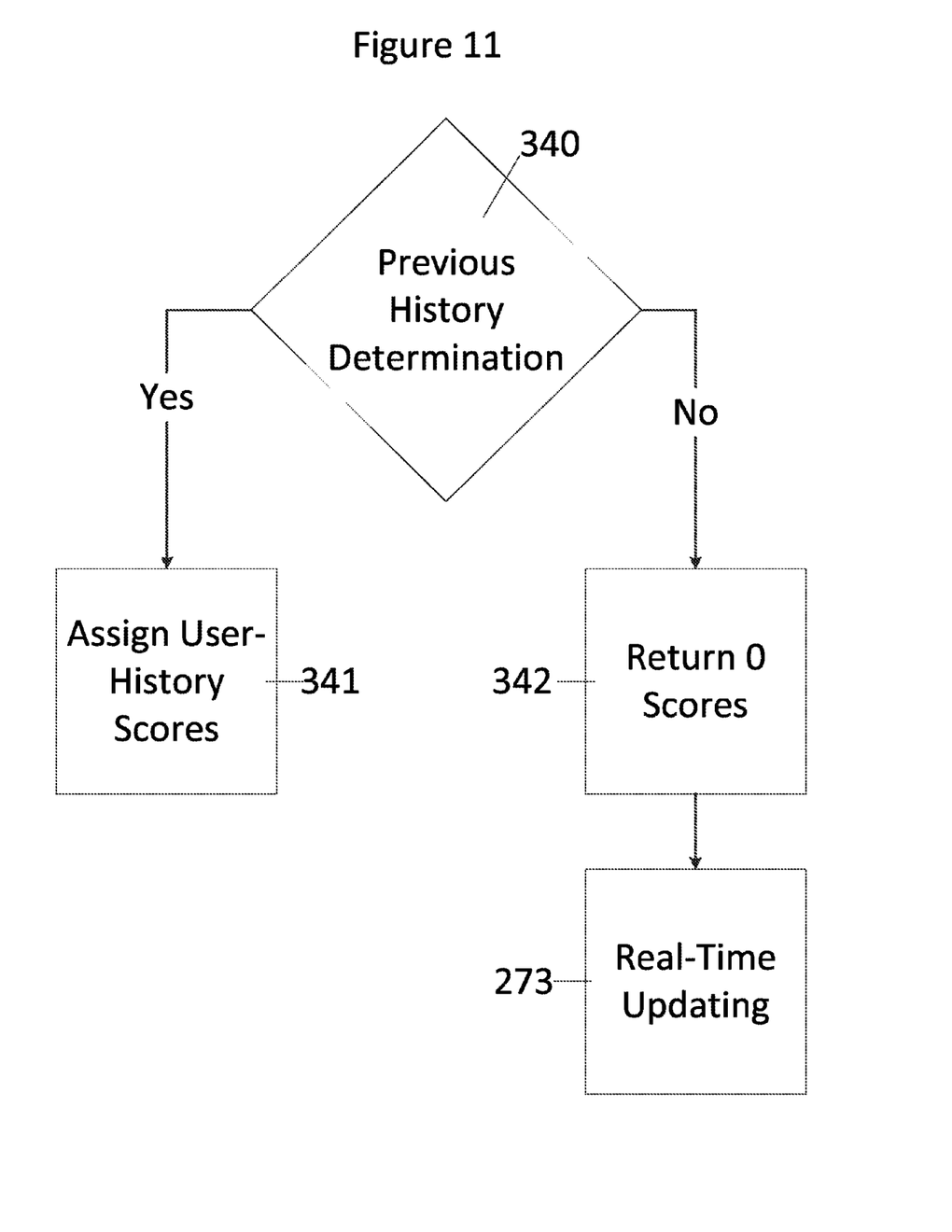
FIG. 11 is a schematic flow chart illustrating steps in behavioural targeting in an embodiment of the present invention.

Behavioural targeting 330 produces a behavioural targeting recommendation score 331 for each item 140. As indicated in FIG. 11, the first step in behavioural targeting 330 is a previous history determination 340, being that the personalized electronic commerce system 100 examines the Behaviour Feedback Database 240 to determine whether the end user 260 has a user history, being a record of previous viewing and/or purchase activity associated with the end user 260.

If the end user 260 has a user history, the personalized electronic commerce system 100 assigns user-history scores 341, being the personalized electronic commerce system 100 assigns a behavioural targeting recommendation score 331 to each item 140 based on the user history and the recorded coefficients (i.e., related to the strength of the predictive relationship between items), in the Global CF Recommendation Agent 250. Optionally, the business may set a threshold recorded coefficient, below which a 0 recommendation score is produced by behavioural targeting, so as to tune the system with respect to items for which there is a weak predictive relationship.

If the end user 260 does not have a user history, behavioural targeting 330 initially returns 0 scores 342, being the behavioural targeting 330 produces a 0 behavioural targeting recommendation score 331 for every item 140. Once the end user 260 begins interacting with the initial presentation of ranked items, the personalized electronic commerce system 100 performs real-time updating 273.

Popularity targeting 360 involves fetching and returning the popularity score 230 for each item 140 from the popularity index 220.

In results merging 380, for each item 140 that is not an excluded item, the personalized electronic commerce system 100 merges the recommendation scores produced by keyword and demographic targeting 300, behavioural targeting 330 and popularity targeting 360, plus each item's set prevalence 190, as indicated in the following example formula:

Let $n_k$ be the recommendation score from the targeting processes (keywords & demographic rules, behavioural, or popularity) and the set prevalence;
Let $c_k$ be the coefficient indicating the relative weighting of a particular $n_k$;

$$\sum_{k=0}^{k_{max}} c_k \times n_k$$

The recommendation scores for an item 140 are combined by multiplying each by a coefficient (the coefficient varies depending on the type of store/site; in a given industry one recommendation score may be more important than the others) and summing those outputs, along with the prevalence factor, so as to produce a final merged recommendation score for each item.

For example, item A may have a keywords and demographic targeting recommendation score of 200, a behavioural targeting recommendation score of 300, a popularity targeting recommendation score of 800, and a prevalence of −2. If the coefficients for each of the targeting methods for the industry/store type are 0.5, 0.3, and 0.2 respectively and the prevalence coefficient is 10, then the merged recommendation score 390 for that item would be 200*0.5+300*0.3+800*0.2−2*10=480.

The items 140 are sorted and ordered 400 based on their merged recommendation scores 390, being from highest to lowest. If two or more items 140 have identical merged recommendation scores 390, their relative ordering is randomized. The items 140 are presented in this order on the user interface 200.

The invention claimed is:

1. A system for preparing a personalized ordered list of a plurality of items for online presentation to an individual user, the system comprising:
    a keyword targeting module, comprising:
        a keywords dictionary data set, comprising a plurality of dictionary words and relatedness indicators indicating whether any two of the dictionary words are related or unrelated;
        an items data set, comprising an item indicator for each item and for each item indicator, one or more item words, being words associated with the item and related words identified using the relatedness indicators;
        a user persona data set, comprising profile words, being words associated with the individual user and related words identified using the relatedness indicators;
        wherein, for each item, the keyword targeting module counts matches between item words and profile words, and returns a keyword targeting recommendation score for the item comprising the count result;
    a behavioural targeting module, that returns a behavioural targeting recommendation score for each item, from the individual user's online interactions with the items and values for the predictive relationship between items;
    a popularity targeting module that returns a popularity targeting recommendation score for each item, from a popularity index data set; and
    a merging and sorting module that:
        for each item, merges the keyword targeting recommendation score, behavioural targeting recommendation score and popularity targeting recommendation score, to produce a merged recommendation score; and
        based on the merged recommendation scores for the items, produces an ordered list of the items;
    a user interface for receiving information from and providing information to the individual user;
    one or more data storage devices and/or one or more computer memory components, and containing the keywords dictionary, the items data set, the user persona data set, the values for the predictive relationship between items, and the popularity index data set
    one or more system computer processors, interconnected with or comprising the one or more data storage devices and/or one or more computer memory components, and having a two-way communication pathway to the user interface, and configured to implement the keyword targeting module, the behavioural targeting module, the popularity targeting module and the merging and sorting module.

2. The system of claim 1, wherein the keywords dictionary data set is created by:
    copying a words source;
    condensing the words source copy by removing punctuation, prepositions, conjunctions, and determiners;
    producing relatedness quantifications for the relatedness between any two words in the condensed words source copy using latent semantic indexing;
    converting the relatedness quantifications to the relatedness indicators, based on both a maximum number of the highest relatedness quantifications and a minimum threshold, wherein each relatedness quantification within the maximum number and over the threshold is converted to a relatedness indicator of related, and a relatedness quantification at or below the threshold is converted to a relatedness indicator of unrelated; and
    normalizing the words in the condensed words source copy, being determining whether each word has a root and if so, replacing the word with its root.

3. The system of claim 2, wherein the words source is Wikipedia™.

4. The system of claim 2, wherein condensing the words source copy is performed based on a linguistic analysis and tagging of the words source copy comprising using a linguistic analysis engine to examine each word in the words source copy and then tagging each word to indicate which part of speech it represents.

5. The system of claim 4, wherein the linguistic analysis engine is Maxent™.

6. The system of claim 2, wherein determining whether each word has a root is done utilizing WordNet™.

7. The system of claim 2, wherein the maximum number of the highest relatedness quantifications is in the range of 100 to 500 and the minimum threshold is a relatedness quantification that is greater than the 20th percentile of all the non-zero relatedness quantifications for the term.

8. The system of claim 7, wherein the maximum number of the highest relatedness quantifications is 300 and the minimum threshold is a relatedness quantification that is greater than the 30th percentile of all the non-zero relatedness quantifications for the term.

9. The system of claim 1, wherein the items are products offered by a business and the words associated with the items comprise descriptive text, prices, brands, and trademarks associated with the items by the business.

10. The system of claim 1, wherein the words associated with the individual user are obtained from social media of the individual user.

11. The system of claim 10, wherein demographic rules are associated with the items and the keyword targeting recommendation score for each item further comprises a determination of whether a demographic mile assigned to the item is satisfied based on demographic information obtained from the social media of the individual user.

12. The system of claim 11, wherein the demographic rule is assigned to the item if a keyword assigned to the demographic rule matches an item word of the item.

13. The system of claim 10, wherein the demographic rule is a filtered demographic rule wherein if the demographic rule is not satisfied the item to which the demographic rule is assigned is not present in the ordered list of the items.

14. The system of claim 1, wherein the values for the predictive relationship between items are calculated by applying a collaborative filtering process to a behaviour data set containing recorded and inferred user-item online interactions.

15. The system of claim 14, wherein the collaborative filtering process is a matrix factorization model.

16. The system of claim 1, wherein the behavioural targeting module determines whether the individual user has a record of user-item online interactions and if not, the behavioural targeting module returns an initial neutral behavioural targeting recommendation score for each item and initiates real-time updating wherein the system records user-item interactions in real time, applies the collaborative filtering process to the real-time user-item interactions and updates the behavioural targeting recommendation score.

17. The system of claim 1, wherein the behavioural targeting module further comprises determining whether a calculated behavioural targeting recommendation score is at or above a minimum score and if not, returning a neutral behavioural targeting recommendation score.

18. The system of claim 1, wherein the popularity index data set contains a popularity score for each item, based on an updated and normalized history of user-item interactions.

19. The system of claim 1, wherein the merged recommendation score for each item is produced by:
   multiplying the keyword targeting recommendation score by a keyword targeting coefficient to produce a keyword output;
   multiplying the behavioural targeting recommendation score by a behavioural targeting coefficient to produce a behavioural output;
   multiplying the popularity targeting recommendation score by a popularity targeting coefficient to produce a popularity output; and
   adding the keyword output, behavioural output and popularity output.

20. The system of claim 1, further comprising a prevalence set for each item; and
   wherein the merged recommendation score for each item is produced by:
      multiplying the keyword targeting recommendation score by a keyword targeting coefficient to produce a keyword output;
      multiplying the behavioural targeting recommendation score by a behavioural targeting coefficient to produce a behavioural output;
      multiplying the popularity targeting recommendation score by a popularity targeting coefficient to produce a popularity output;
      multiplying the prevalence targeting recommendation score by a prevalence coefficient to produce a prevalence output; and
      adding the keyword output, behavioural output, popularity output and prevalence output.

* * * * *